United States Patent
Sakakura

(10) Patent No.: US 8,956,731 B2
(45) Date of Patent: Feb. 17, 2015

(54) GAS BARRIER SHEET

(75) Inventor: Osamu Sakakura, Sayama (JP)

(73) Assignee: Dai Nippon Printing Co., Ltd., Shinjuku-Ku (JP)

(*) Notice: Subject to any disclaimer, the term of this patent is extended or adjusted under 35 U.S.C. 154(b) by 659 days.

(21) Appl. No.: 12/335,734

(22) Filed: Dec. 16, 2008

(65) Prior Publication Data
US 2009/0214882 A1 Aug. 27, 2009

(30) Foreign Application Priority Data
Feb. 27, 2008 (JP) .................................. 2008-46364

(51) Int. Cl.
| | | |
|---|---|---|
| *B32B 27/16* | (2006.01) | |
| *B32B 27/28* | (2006.01) | |
| *B32B 27/36* | (2006.01) | |
| *C08J 7/04* | (2006.01) | |

(52) U.S. Cl.
CPC .............. *B32B 27/16* (2013.01); *B32B 27/283* (2013.01); *B32B 27/36* (2013.01); *C08J 7/042* (2013.01); *B32B 2255/10* (2013.01); *B32B 2255/20* (2013.01); *B32B 2307/202* (2013.01); *B32B 2307/412* (2013.01); *B32B 2307/7242* (2013.01); *C08J 2367/02* (2013.01); *C08J 2483/04* (2013.01)
USPC ......................................................... 428/447

(58) Field of Classification Search
None
See application file for complete search history.

(56) References Cited

U.S. PATENT DOCUMENTS

| | | | | |
|---|---|---|---|---|
| 4,461,867 | A * | 7/1984 | Surprenant | 524/788 |
| 4,826,904 | A * | 5/1989 | Matsumura et al. | 524/314 |
| 6,268,440 | B1 * | 7/2001 | Kudo et al. | 525/477 |
| 2005/0079380 | A1 * | 4/2005 | Iwanaga | 428/688 |
| 2006/0001040 | A1 * | 1/2006 | Kim et al. | 257/100 |
| 2006/0210727 | A1 * | 9/2006 | Ibuki et al. | 428/1.31 |
| 2007/0049708 | A1 * | 3/2007 | Kutsuna et al. | 525/529 |
| 2007/0071970 | A1 * | 3/2007 | Koike et al. | 428/343 |
| 2007/0269664 | A1 | 11/2007 | Fujii et al. | |

(Continued)

FOREIGN PATENT DOCUMENTS

| | | | |
|---|---|---|---|
| JP | 08-295848 A1 | 11/1996 | |
| JP | 2001279137 A * | 10/2001 | C09D 11/00 |

(Continued)

OTHER PUBLICATIONS

JP 2001279137 A Machine Translation Oct. 2001.*

(Continued)

*Primary Examiner* — Kenneth Stachel
(74) *Attorney, Agent, or Firm* — Burr & Brown, PLLC

(57) ABSTRACT

A gas barrier sheet comprising a substrate, an anchor film formed on one surface of the substrate, and a gas barrier film formed on the anchor film, the anchor film comprising a siloxane polymer composed of a siloxane compound and a compound A having in its molecule a functional group that can react with hydroxyl group in the siloxane compound, the gas barrier film being a $SiN_xO_y$ film (x=0.5-1.5, y=0.15-1). The gas barrier sheet has good transparency and high heat resistance, hardly curls, and is excellent in hard coating property, in gas-barrier properties and in the adhesion between its constituent films. Particularly, the gas barrier sheet remains uncurled and retains its gas-barrier properties even after it has undergone a heat cycle test which is carried out to test the durability of an organic EL display or the like.

6 Claims, 3 Drawing Sheets

(56) References Cited

U.S. PATENT DOCUMENTS

2008/0180020 A1* 7/2008 Cok .............................. 313/503
2010/0098955 A1 4/2010 Sakakura

FOREIGN PATENT DOCUMENTS

| JP | 2004-148673 A1 | 5/2004 |
| JP | 2005-313560 A1 | 11/2005 |
| JP | 2006-056036 A1 | 3/2006 |
| JP | 2006-123289 A1 | 5/2006 |
| JP | 2006-239884 A1 | 9/2006 |
| JP | 2009-023331 A1 | 2/2009 |

OTHER PUBLICATIONS

JP 2006-056036 English machine translation from JPO IPDL (2006).*

Japanese Office Action dated Jun. 5, 2012 (with English translation).

* cited by examiner

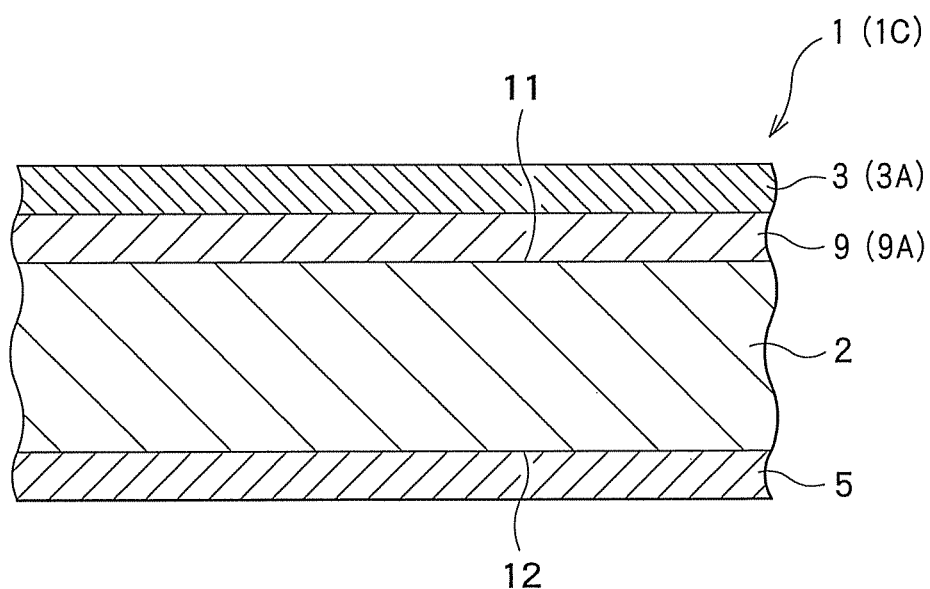
F I G. 3
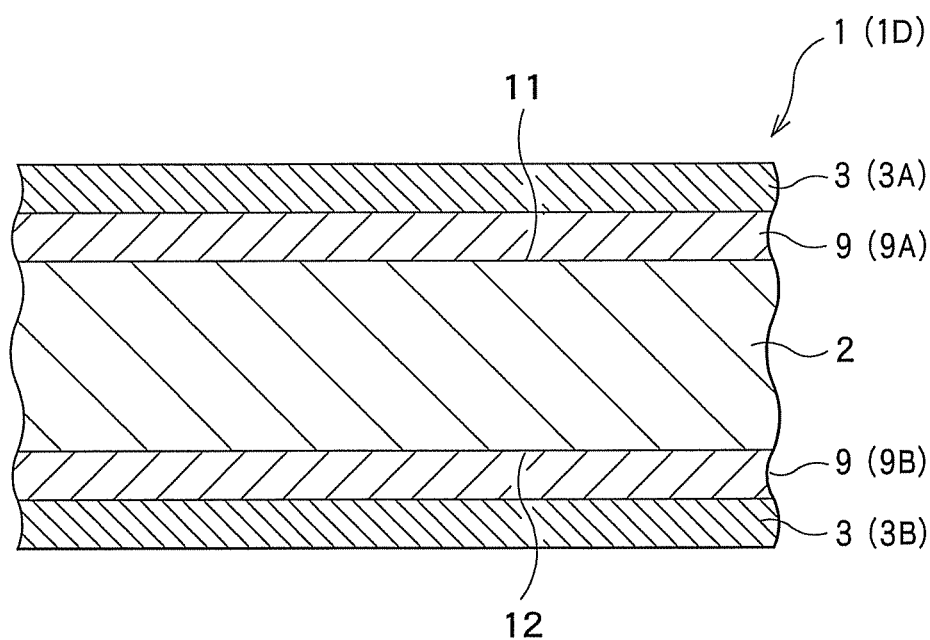
F I G. 4

GAS BARRIER SHEET

CROSS-REFERENCE TO RELATED APPLICATION

This application for patent enjoys the benefit of the right to Japanese Patent Application No. JP2008-046364 filed on Feb. 27, 2008. The whole description of the said earlier patent application is incorporated herein by reference.

BACKGROUND OF THE INVENTION

1 Field of the Invention

The present invention relates to a gas barrier sheet, and more particularly, to a gas barrier sheet that has good transparency and high heat resistance, hardly curls, and is excellent in the adhesion between its constituent films, in hard coating property and in gas-barrier properties.

2. Background Art

Attempts to attain a high level of gas-barrier properties by forming, on substrate films, thin films of inorganic or organic materials have been made so far.

In Japanese Laid-Open Patent Publication No. JP2005-313560 is presented a gas barrier film having a layered structure composed of a flexible substrate, an acrylic resin layer with a thickness of 0.1 to 10 µm, that is a hardened layer of a UV-curing resin containing, as a polymerizable component, an acrylic monomer and/or a polymerizable acrylic prepolymer alone, and an inorganic barrier layer with a thickness of 20 to 100 nm, the acrylic resin layer and the inorganic barrier layer being situated on one side or both sides of the substrate in the order named.

According to the above publication, if a hardened layer of the above specified UV-curing resin, having a specified thickness, is formed directly on a flexible substrate, and an inorganic barrier layer with a specified thickness is further formed on the hardened resin layer, a gas barrier film having excellent gas-barrier properties can be obtained without experiencing curling in its production process. And $SiO_x$, $AlO_x$, $SiO_xN_y$, $SiN_x$, $SiO_xN_yC_z$, $SiN_xC_y$, $AlO_xN_y$, $AlN_x$, $AlO_xN_yC_z$, $AlN_xC_y$, etc. are enumerated as examples of ceramic materials useful for the inorganic barrier layer.

Japanese Laid-Open Patent Publication No. IP8-295848 (1996) describes a surface-treated resin-made material that is a resin-made material whose one or both surfaces are treated with a specified composition for surface treatment. The composition for surface treatment comprises an organic compound (A) for making the composition film to be formed flexible, a compound (B) having in its molecule a functional group that can react with amino group in the organic compound (A), a specified organometallic compound (C), and a solvent (D). Specifically, in Example 1 described in this patent publication, polyethyleneimine is used as the organic compound (A), γ-glycidoxy-propyltrimethoxysilane as the compound (B), tetramethoxysilane as the compound (C), and methanol as the solvent (D).

In Japanese Laid-Open Patent Publication No. JP2005-313560, by combining an acrylic resin film with a specified thickness and a gas barrier film made from an inorganic material, having a specified thickness, a gas barrier sheet having both gas-barrier properties and anti-curl properties is produced.

In the above Japanese Laid-Open Patent Publication No. JP2005-313560, however, the acrylic resin film tends to yellow with heat when the gas barrier sheet is thermally treated, in the post-production process, under more severe conditions for the purpose of producing a multi-layer structure or for annealing. Yellowing of the acrylic resin film makes the gas-barrier sheet yellowish. Thus the gas-barrier sheet described in this publication still remains unsatisfactory in heat resistance.

Also the surface-treated resin-made material (hereinafter referred to as a "gas barrier sheet") that is a resin-made material whose one or both surfaces are treated with a specified composition for surface treatment, described in the above Japanese Laid-Open Patent Publication No. JP8-295848, was found to be still unsatisfactory in gas-barrier properties, transparency, heat resistance and anti-curl properties.

Namely, when the intended use of a gas barrier sheet is a liquid crystal display, an organic EL display, or the like, the gas barrier sheet is usually required to have such excellent gas-barrier properties that its water vapor permeability is 0.1 $g/m^2/day$ ($g/m^2 \cdot day$) or less, and that its oxygen permeability is 0.1 $cc/m^2/day \cdot atm$ ($cc/m^2 \cdot day \cdot atm$) or less. However, the gas barrier sheet described in the above Japanese Laid-Open Patent Publication No. JP8-295848 cannot exhibit such excellent gas-barrier properties, as shown in Examples described in the publication.

Further, when the intended use of a gas barrier sheet is an organic EL display or the like, it is desirable that the gas barrier sheet be highly transparent. However, in Japanese Laid-Open Patent Publication No. JP8-295848, since the organic compound (A) is used for making the film to be formed flexible, the film formed contains an increased number of organic functional groups and thus tends to have light absorption in the visible light range. Consequently, the gas barrier sheet described in this publication tends to have decreased transparency. Thus transparency also remains a problem with this gas barrier sheet.

Furthermore, due to the organic compound (A), a large number of organic functional groups are present in the film formed, so that the gas barrier sheet is readily colored when thermally loaded. Thus heat resistance is another problem with the above gas barrier sheet.

Moreover, when the intended use of a gas barrier sheet is an organic EL display or the like, it is desirable that the gas barrier sheet hardly curl even when held at high temperatures, if the production process of an organic EL display or the like is taken into account. However, in Japanese Laid-Open Patent Publication No. JP8-295848, the organic compound (A) is used to make the film to be formed flexible, so that the film formed contains an increased number of organic functional groups and thus has increased film stress. Consequently, the gas barrier sheet described in this publication easily curls. Thus this gas barrier sheet is unsatisfactory also from the viewpoint of curling prevention.

The present invention was accomplished in order to solve the above-described problems in the prior art. An object of the present invention, therefore, is to provide a gas barrier sheet excellent in transparency, heat resistance, anti-curl properties, and gas-barrier properties. Another object of the invention is to provide a gas barrier sheet having the following advantages in addition to the above properties: the sheet is excellent in hard coating property (i.e., can satisfactorily serve as a hard coating) and also in the adhesion between its constituent films. Particularly, an object of the invention is to provide a gas barrier sheet that remains uncurled and retains its gas-barrier properties even after it has undergone a heat cycle test which is carried out to test the durability of an organic EL display or the like.

SUMMARY OF THE INVENTION

We found that it is possible to obtain a gas barrier sheet comprising a substrate, an anchor film and a gas barrier film, having high heat resistance, good transparency and specified rigidity, by using a siloxane polymer for the anchor film and controlling the structure of the siloxane polymer. Since the gas barrier sheet has moderate rigidity, it hardly curls even when thermally loaded and has excellent hard coating property. On the anchor film, a gas barrier film is formed using a silicon oxynitride with a specified composition. The combination of the two layers, the anchor film and the gas barrier film, ensures excellent gas-barrier properties. Thus we found that it is possible to attain a high level of gas-barrier properties. Furthermore, Si in the gas barrier film has a high affinity for Si in the anchor film, and Si—C bond in the anchor film increases the adhesion between the anchor film and the substrate. Thus we found that increased adhesion can be obtained between the substrate and the anchor film and between the anchor film and the gas barrier film. Particularly, we found that it is possible to obtain a gas barrier sheet that has excellent gas-barrier properties that are required for organic EL displays, and that remains uncurled and retains its gas-barrier properties even after it has undergone a heat cycle test which is carried out to test the durability of an organic EL display.

A gas barrier sheet of the present invention, for solving the above-described problems in the prior art, comprises a substrate, an anchor film formed on one surface of the substrate, and a gas barrier film formed on the anchor film, the anchor film comprising a siloxane polymer composed of a siloxane compound and a compound A having in its molecule a functional group that can react with hydroxyl group contained in the siloxane compound when the compound A is reacted with the siloxane compound, the gas barrier film being a $SiN_xO_y$ film, where x is 0.5 to 1.5, and y is 0.15 to 1.

In the present invention, the anchor film comprises a siloxane polymer composed of a siloxane compound and a compound A having in its molecule a functional group that can react with hydroxyl group in the siloxane compound, and the gas barrier film is a $SiN_xO_y$ film, where x is 0.5 to 1.5, and y is 0.15 to 1. Therefore, by controlling the structure of the siloxane polymer, it is possible to control the transparency, heat resistance and rigidity of the anchor film, and the combination of the two layers, the anchor film and the gas barrier film, ensures excellent gas-barrier properties. Further, Si in the anchor film and Si in the gas barrier film enhance the interaction between the anchor film and the gas barrier film, and Si—C bond in the anchor film enhances the interaction between the anchor film and the substrate. Thus it is possible to provide a gas barrier sheet that has good transparency and high heat resistance, hardly curls, and is excellent in hard coating property, in gas-barrier properties and in the adhesion between its constituent films.

In a preferred embodiment of the gas barrier sheet of the present invention, the siloxane polymer is composed of 70 to 99 mol % of the siloxane compound and 1 to 30 mol % of the compound A.

In the above embodiment of the invention, since the siloxane polymer is composed of 70 to 99 mol % of the siloxane compound and 1 to 30 mol % of the compound A, it is possible to control the transparency, heat resistance and rigidity of the anchor film more accurately by controlling the structure of the siloxane polymer. This makes it easier to provide a gas barrier sheet that has good transparency and high heat resistance, hardly curls, and is excellent in hard coating property.

In another preferred embodiment of the gas barrier sheet of the present invention, the anchor film has a extinction coefficient in the range of 0.00001 to 0.01.

In the above embodiment, the anchor film has a extinction coefficient in the range of 0.00001 to 0.01, so that it is transparent. This makes it easier to provide a gas barrier sheet excellent in transparency.

In yet another preferred embodiment of the gas barrier sheet of the present invention, the gas barrier film has a extinction coefficient in the range of 0.000001 to 0.01.

In the above embodiment, the gas barrier film has a extinction coefficient in the range of 0.000001 to 0.01, so that it is transparent. This makes it easier to provide a gas barrier sheet excellent in transparency.

In another preferred embodiment of the gas barrier sheet of the present invention, the anchor film is formed also on the other surface of the substrate, and the gas barrier film is formed also on this anchor film.

In the above embodiment, the anchor film is formed also on the other surface of the substrate, and the gas barrier film is also formed on this anchor film, so that the substrate is to have, on each side, the anchor film and the gas barrier film, attaining a higher level of gas-barrier properties and higher rigidity. This makes it easier to provide a gas barrier sheet that hardly curls and is excellent in hard coating property and gas-barrier properties.

In another preferred embodiment of the gas barrier sheet of the present invention, the gas barrier sheet further comprises a transparent conductive film formed on the gas barrier film.

In the above embodiment, a transparent conductive film is formed on the gas barrier film, and it can serve as the anode of an organic EL display, or can provide the gas barrier sheet with heat-dissipating properties and antistatic properties. It is therefore possible to improve an organic EL display in productivity and life by forming a transparent conductive film.

In another preferred embodiment of the gas barrier sheet of the present invention, the gas barrier sheet further comprises a hard-coating film formed on at least one of its outermost surfaces.

In the above embodiment, a hard-coating film is formed on at least one of the outermost surfaces of the gas barrier sheet, so that it serves to protect the gas barrier sheet. This makes it easier to provide a gas barrier sheet that is hardly scratched.

In another preferred embodiment of the gas barrier sheet of the present invention, the gas barrier film is formed by agglomeration of multiple secondary particles, and the diameter of the secondary particles is 300 nm or more and 1500 nm or less.

In the above embodiment, the gas barrier film is formed by agglomeration of multiple secondary particles, and the diameter of the secondary particles is 300 nm or more and 1500 nm or less, so that adjacent secondary particles fully agglomerate. This makes it easier to produce a gas barrier sheet having excellent gas-barrier properties while retaining the flexibility of the substrate, without causing a decrease in productivity.

In another preferred embodiment of the gas barrier sheet of the invention, the distance between two adjacent secondary particles is 100 nm or more and 300 nm or less.

In the above embodiment, the distance between two adjacent secondary particles is 100 nm or more and 300 nm or less, so that adjacent secondary particles agglomerate satisfactorily. This makes it possible to provide a gas barrier sheet while retaining the flexibility of the substrate more easily.

Thus the present invention can provide a gas barrier sheet excellent in transparency, heat resistance, anti-curl properties, and gas-barrier properties. The present invention can also provide a gas barrier sheet having the following advantages in addition to the above properties: the sheet is excellent in hard coating property and also in the adhesion between its constituent films.

BRIEF DESCRIPTION OF THE DRAWINGS

FIG. 3 is a schematic cross-sectional view of yet another gas barrier sheet of the present invention.

FIG. 4 is a schematic cross-sectional view of another gas barrier sheet of the present invention.

DETAILED DESCRIPTION OF THE INVENTION

Embodiments of the present invention will be hereinafter described in detail. The present invention, however, is not limited to the following embodiments and is susceptible to modifications without departing from the spirit of this disclosure and the scope of the appended claims.

Figure 1:
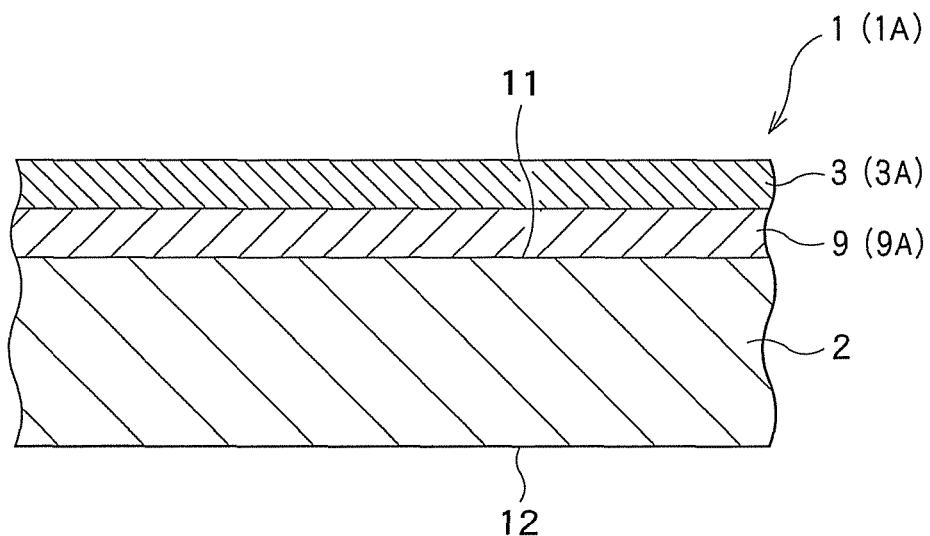
FIG. 1 is a schematic cross-sectional view of a gas barrier sheet of the present invention.
Figure 2:
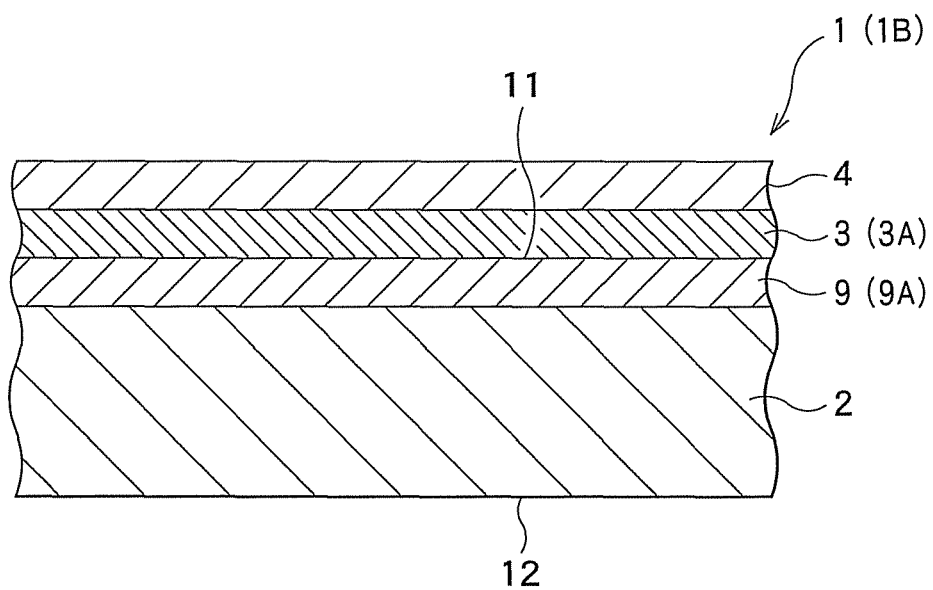
FIG. 2 is a schematic cross-sectional view of another gas barrier sheet of the present invention.
Figure 5:
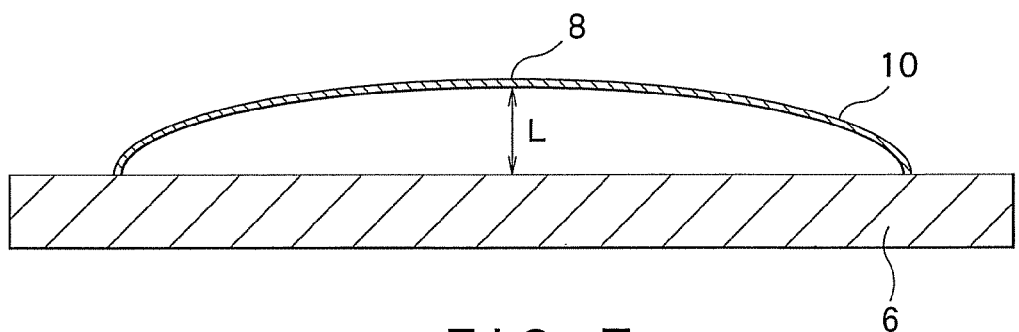
FIG. 5 is a schematic cross-sectional view showing a method for evaluating the degree of curling of a gas barrier sheet.
Figure 6:
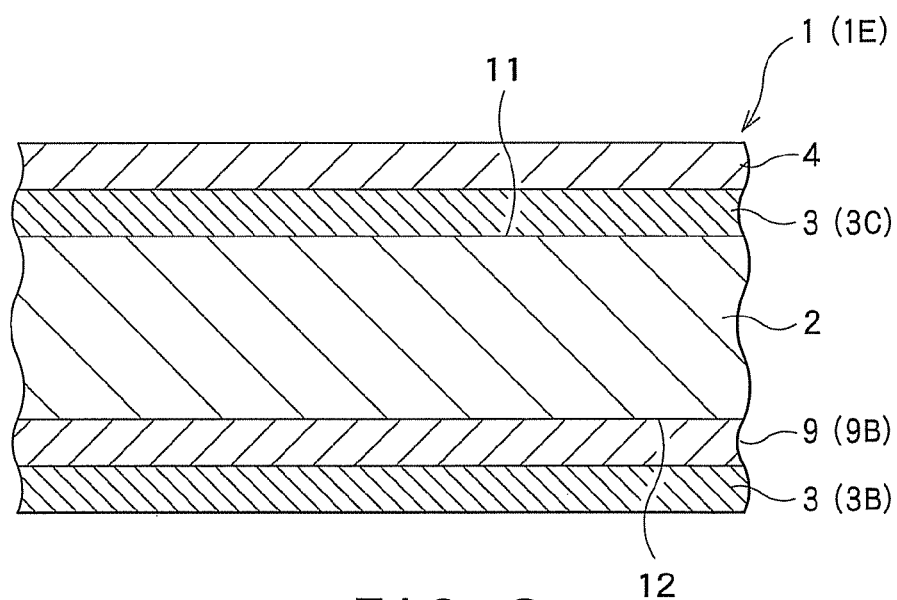
FIG. 6 is a schematic cross-sectional view of another gas barrier sheet of the present invention.

FIG. 1 is a schematic cross-sectional view of a gas barrier sheet of the present invention, FIG. 2, a schematic cross-sectional view of another gas barrier sheet of the invention, FIG. 3, a schematic cross-sectional view of yet another gas barrier sheet of the invention, and FIG. 4, a schematic cross-sectional view of another gas barrier sheet of the invention. FIG. 5 is a schematic cross-sectional view showing a method for evaluating the degree of curling of a gas barrier sheet. FIG. 6 is a schematic cross-sectional view of another gas barrier sheet of the present invention, and FIG. 7, a schematic cross-sectional view of yet another gas barrier sheet of the invention.

A gas barrier sheet 1 (1A) of the present invention comprises, as shown in FIG. 1, a substrate 2, an anchor film 9A formed on one surface 11 of the substrate 2, and a gas barrier film 3A formed on the anchor film 9A.

A gas barrier sheet 1 (1B) of the present invention may also be made up of a substrate 2, an anchor film 9A formed on one surface 11 of the substrate 2, a gas barrier film 3A formed on the anchor film 9A, and a transparent conductive film 4 formed on the gas barrier film 3A, as shown in FIG. 2.

A gas barrier sheet 1 (1C) of the invention may further comprise, as shown in FIG. 3, a hard-coating film 5 formed on at least one of its outermost surfaces. More specifically, a gas barrier sheet 1C comprises a substrate 2, an anchor film 9A formed on one surface 11 of the substrate 2, a gas barrier film 3A formed on the anchor film 9A, and a hard-coating film 5 formed on the other surface 12 of the substrate 2, i.e., on the surface opposite to the surface on which the anchor film 9A has been formed.

A gas barrier sheet 1 (1D) of the invention may further comprise, as shown in FIG. 4, an anchor film 9B formed on the other surface 12 of the substrate 2, and a gas barrier film 3B formed on the anchor film 9B. Since the anchor films 9A, 9B and the gas barrier films 3A, 3B are formed so that they sandwich the substrate 2, the substrate 2 is to have the anchor film and the gas barrier film on each side, attaining a higher level of gas-barrier properties and higher rigidity. This makes it easier to provide a gas barrier sheet that hardly curls and is excellent in hard coating property and gas-barrier properties.

A gas barrier sheet 1 (1E) of the present invention may also be made up of a substrate 2, a gas barrier film 3C and a transparent conductive film 4 formed on one surface 11 of the substrate 2, and an anchor film 9B and a gas barrier film 3B formed on the other surface 12 of the substrate, as shown in FIG. 6. More specifically, in a gas barrier sheet 1E, a gas barrier film 3C is situated on one surface 11 of a substrate 2, and a transparent conductive film 4, on the gas barrier film 3C, while an anchor film 9B is situated on the other surface 12 of the substrate 2, and a gas barrier film 3B, on the anchor film 9B.

Figure 7:
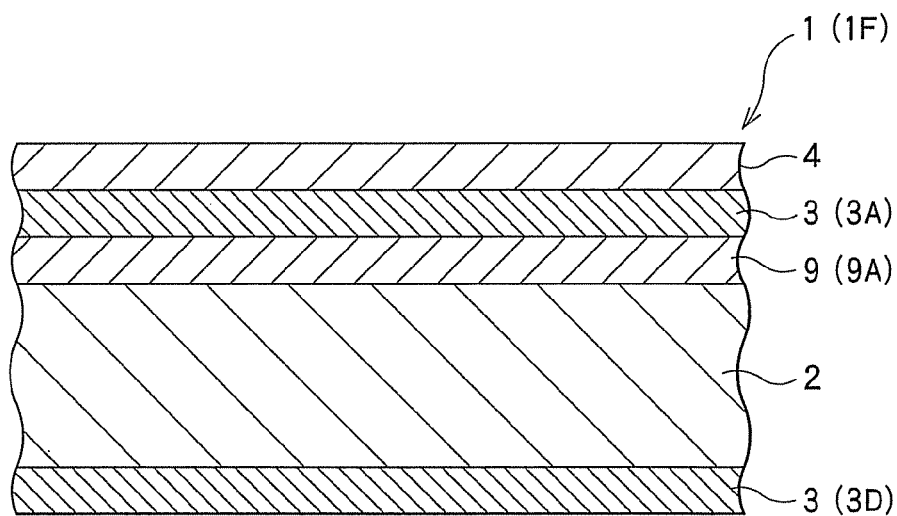
FIG. 7 is a schematic cross-sectional view of yet another gas barrier sheet of the present invention.

A gas barrier sheet 1 (1F) of the present invention may also be as shown in FIG. 7. Namely, an anchor film 9A, a gas barrier film 3A and a transparent conductive film 4 are formed on one side of a substrate 2, as in the production of the gas barrier sheet 1B (FIG. 2), and a gas barrier film 3D is formed on the other side of the substrate 2. More specifically, in a gas barrier sheet 1F, an anchor film 9A, a gas barrier film 3A and a transparent conductive film 4 are situated on one surface 11 of a substrate 2 in this order, and a gas barrier film 3D, on the other surface 12 of the substrate 2.

The lamination of the gas barrier sheet of the present invention is not limited to the above-described ones. For example, a gas barrier film may be formed in place of the hard-coating film. Furthermore, it is not always necessary that the anchor film be in contact with the substrate, or that the gas barrier film be in contact with the anchor film, and, if necessary, any adequate film may be formed so that it is situated between the substrate and the anchor film or between the anchor film and the gas barrier film. The lamination of the gas barrier sheet is susceptible to various modifications without departing from the scope of the invention.

(Substrate)

A variety of substrates can be used for the substrate 2. A substrate in sheet, film, or rolled sheet/film form is typically used, and depending on the intended use or purpose of the gas barrier sheet to be finally produced, a non-flexible or flexible substrate can be used. Examples of substrates useful herein include non-flexible substrates such as glass plates, hard resin boards, wafers, printed circuit boards, a variety of cards, and resin sheets, and flexible substrates made from polyethylene terephthalate (PET), polyamides, polyolefins, polyethylene naphthalate (PEN), polycarbonate, polyacrylate, polymethacrylate, polyurethane acrylate, polyether sulfone, polyimide, polysilsesquioxanes, polynorbornene, polyether imide, polyallylates, non-crystalline cyclopolyolefins and cellulose triacetate. To make the substrate 2 from resins, a mixture of two or more resins selected from the above-enumerated ones may be used. Heat-resistant resins capable of withstanding high temperatures of preferably 100° C. or more, particularly 150° C. or more are suited to the resin-made substrate 2.

Specific examples of such resin-made substrates 2 include commercially available films, such as non-crystalline cyclopolyolefin resin films (e.g., Zeonex® and Zeonoa® manufactured by NIPPON ZEON CO., LTD., Japan, and ARTON manufactured by JSR Corporation, Japan), polycarbonate films (e.g., Pure Ace manufactured by Teijin Chemicals Ltd., Japan), polyethylene terephthalate films (e.g., articles manufactured by Teijin Chemicals Ltd., Japan), cellulose triacetate films (e.g., Konicatack KC4UX and KC8UX manufactured by Konicaminolta Opt Co., Ltd., Japan), and polyethylene naphthalate films (e.g., Teonex® manufactured by Teijin Dupont Films Japan Limited, Japan).

The thickness of the substrate 2 is made usually 10 μm or more, preferably 50 μm or more, and usually 200 μm or less, preferably 150 μm or less, with consideration for flexibility and shape retention.

When the substrate 2 is used as the substrate of a light-emitting device, such as an organic EL display, which must be transparent, it is preferred that the substrate 2 be colorless and transparent. By making not only the substrate 2 but also the other constituent films such as the gas barrier film 3 colorless and transparent, it is possible to obtain a transparent gas barrier sheet 1. More specifically, it is preferable to make the substrate 2 so that it has such high transparency that its mean light transmittance is 80% or more for light of 400 to 700 nm, for example. Since the material and the thickness of the substrate 2 affect the light transmittance, these two are taken into account when making the substrate 2.

It is preferred that the substrate 2 surface be smooth. Specifically, the arithmetic mean roughness (Ra) of the substrate 2 surface is usually 0.3 nm or more. A substrate 2 having a surface whose Ra is in the above range is moderate in roughness, and when rolled up, its contact surfaces in the roll hardly slip from each other. On the other hand, the arithmetic mean roughness (Ra) of the substrate 2 surface is usually 100 nm or less, preferably 50 nm or less, more preferably 30 nm or less. A substrate 2 having a surface whose Ra is in the above range has improved smoothness, and this makes it easier to prevent short circuit that sometimes occurs in the production of a display device such as an organic EL display. The arithmetic mean roughness (Ra) of the substrate 2 surface may be measured in accordance with JIS B 0601-2001 (based on ISO 4287-1997).

It is preferred that the substrate 2 be hardly deformed by heat. This is because it is necessary that the gas barrier sheet 1 be not deformed even when stressed by heating and cooling as in a heat cycle test, if its intended use is an organic EL display. Specifically, the coefficient of linear expansion of the substrate 2 is usually 5 ppm/° C. or more and 80 ppm/° C. or less, preferably 50 ppm/° C. or less. The coefficient of linear expansion of the substrate 2 may be measured by a known technique, such as TMA (thermomechanical analysis). For the above measurement by TMA can be used a differential-expansion-type thermomechanical analytical instrument CN8098F1 manufactured by RIGAKU Corp., Japan, for example.

When a resin-made substrate is used as the substrate 2, a known, conventional method can be employed to make it. A stretched film may be used as the resin-made substrate 2. Also for film stretching, a known, conventional method can be used. The stretch ratio can be determined depending on the resin to be used for the substrate 2, and the preferred stretch ratio is 2 to 10 times in both vertical and horizontal directions.

The substrate 2 surface may be subjected to such surface treatment as corona treatment, flame treatment, plasma treatment, glow discharge treatment, surface-roughening treatment, heat treatment, chemical treatment, UV-light irradiation treatment, atmospheric plasma treatment and adhesion-facilitating treatment. These surface treatments can be carried out in known manners.

(Anchor Film)

The anchor film 9 comprises a siloxane polymer composed of a siloxane compound and a compound A having in its molecule a functional group that can react with hydroxyl group in the siloxane compound when the compound A is reacted with the siloxane compound. More specifically, the siloxane polymer is obtained by polymerizing the siloxane compound and the compound A. By controlling the structure of the siloxane polymer, it is possible to control the transparency, heat resistance and rigidity of the anchor film 9. This makes it possible to provide a gas barrier sheet 1 that has good transparency and high heat resistance, hardly curls, and is excellent in hard coating property. More specifically, there can be obtained a siloxane polymer which the degree of polymerization of the siloxane compound is controlled by the compound A. It is therefore possible to control the transparency, heat resistance and rigidity of the anchor film 9 by regulating the proportion of Si—O bond in the siloxane polymer.

Moreover, Si—C bond in the anchor film 9 enhances the interaction between the anchor film 9 and the substrate 2. Especially when resins are used for the substrate 2, Si—C bond in the anchor film 9 has a high affinity for these resins. More specifically, when a polyester resin is used for the substrate 2, the interaction between C—C bond in the polyester resin and Si—C bond in the anchor film 9 is particularly enhanced. This makes it possible to provide a gas barrier sheet 1 excellent in the adhesion between the substrate 2 and the anchor film 9.

Examples of siloxane compounds useful herein include alkoxysilanes such as tetramethoxysilane, tetraethoxysilane, tetraisopropoxysilane, tetrabutoxysilane, methyltrimethoxysilane, methyltriethoxysilane, methyltriisopropoxysilane, methyltributoxysilane, ethyltrimethoxysilane, ethyltriethoxysilane, ethyltriisopropoxysilane, ethyltributoxysilane, dimethyldimethoxysilane, dimethyidiethoxysilane, dimethyldiisopropoxysilane, dimethyldibutoxysilane, diethyldimethoxysilane, diethyldiethoxysilane, diethyldiisopropoxysilane, diethyldibutoxysilane, vinyltrimethoxysilane, vinyltriethoxysilane, vinyltriisopropoxysilane, vinyltributoxysilane, γ-mercaptopropyl-trimethoxysilane, γ-mercaptopropyltriethoxysilane, γ-methacryloxypropyl-trimethoxysilane and γ-methacryloxypropyltriethoxysilane; complex compounds of these alkoxysilanes; such compounds as methyltriacetoxysilane and trimethylsilanol; and high-molecular organic compounds containing such compounds as methyltriacetoxysilane and trimethylsilanol.

From the viewpoint of reactivity control on polymerization, it is preferable to use, as the siloxane compound, at least one compound selected from tetraethoxysilane, tetramethoxysilane, tetraisopropoxysilane and tetrabutoxysilane, and it is more preferable to use at least one compound selected from tetraethoxysilane and tetraisopropoxysilane.

The compound A having in its molecule a functional group that can react with hydroxyl group in the siloxane compound is used for controlling the degree of polymerization of the siloxane compound. The use of the compound A makes it possible to control the rigidity of the anchor film 9 while retaining the transparency of the anchor film 9. Thus the use of the compound A makes it easy to prevent not only the anchor film 9 but also the gas barrier sheet 1 from curling. Moreover, the use of the compound A makes it easier to obtain a gas barrier sheet 1 having excellent hard coating property.

Any compound can be used as the compound A as long as it has in its molecule a functional group that can react with hydroxyl group in the siloxane compound. Examples of such functional groups include epoxy group, carboxyl group, isocyanate group, and oxazolinyl group.

Examples of the compound A include methyl formate, methyl acetate, methyl propionate, methyl butyrate, methyl valerianate, dimethyl oxalate, dimethyl malonate, dimethyl succinate, ethyl formate, ethyl acetate, ethyl propionate, ethyl butyrate, ethyl valerianate, diethyl oxalate, diethyl malonate, and diethyl succinate. When a coating liquid containing the siloxane polymer is used to form the anchor film 9, it is preferable to use as the compound A at least one compound selected from methyl formate, methyl acetate, methyl propionate, dimethyl malonate and dimethyl oxalate, and it is more preferable to use at least one compound selected from methyl formate, methyl acetate, dimethyl malonate and dimethyl oxalate, in order that the coating liquid may not lose its coating properties as the reaction progresses.

By controlling the proportions of the siloxane compound and the compound A to be polymerized, it becomes easy to obtain a siloxane polymer having the desired transparency, heat resistance and rigidity. More specifically, it is preferred that the siloxane polymer be composed of 70 to 99 mol % of the siloxane compound and 1 to 30 mol % of the compound A. By so controlling the structure of the siloxane polymer, it becomes possible to control more accurately the transparency, heat resistance and rigidity of the anchor film 9. This makes it easier to provide a gas barrier sheet 1 that has good transparency and high heat resistance, hardly curls, and is excellent in hard coating property. Particularly, by controlling the rigidity of the anchor film 9, it becomes easier to obtain a gas barrier sheet 1 that hardly curls and is excellent in hard coating property.

Although the proportion of the siloxane compound in the siloxane polymer is 50 mol % or more, it is preferably 70 mol % or more, as mentioned above. The proportion of the siloxane compound in the siloxane polymer is more preferably 75 mol % or more, most preferably 80 mol % or more, if improvement in the adhesion to the gas barrier film 3 is taken into account. On the other hand, the proportion of the siloxane compound in the siloxane polymer is preferably 99 mol % or less, as mentioned above, and from the viewpoint of film stress, it is made more preferably 95 mol % or less, most preferably 90 mol % or less.

The proportion of the compound A in the siloxane polymer is preferably 1 mol % or more, as mentioned above, and from the viewpoint of reactivity, it is made more preferably 5 mol % or more, most preferably 10 mol % or more. On the other hand, the proportion of the compound A in the siloxane polymer is usually 50 mol % or less, and as mentioned above, it is preferably 30 mol % or less. When a siloxane-polymer-containing coating liquid is used to form the anchor film 9, the proportion of the compound A in the siloxane polymer is made more preferably 25 mol % or less, most preferably 20 mol % or less, from the viewpoint of the shelf life of the coating liquid.

Ingredients other than the siloxane polymer may be incorporated in the anchor film 9. For example, when a siloxane-polymer-containing coating liquid is used to form the anchor film 9, a surface-active agent such as sodium lauryl sulfate, polyvinyl alcohol, or polyethylene glycol may be added to the coating liquid to improve its dispersibility. When ingredients other than the siloxane polymer are added to the coating liquid, they are added in such an amount that their content in the coating liquid falls usually in the range of 3% to 15% by weight.

It is preferred that the extinction coefficient of the anchor film 9 be 0.00001 or more and 0.01 or less, more preferably 0.00005 or more, most preferably 0.0001 or more, and more preferably 0.005 or less, most preferably 0.003 or less. An anchor film 9 having a extinction coefficient in the above range is transparent, so that it makes it easier to produce a gas barrier sheet 1 having high transparency.

The extinction coefficient of the anchor film 9 can be measured by a known method, and an ellipsometer, for example, may be used. In the present invention, the extinction coefficient of the anchor film 9 is measured with a UVISEL™ manufactured by JOBIN YVON Corp. Using a xenon lamp as a light source, measurement is made under the following conditions: the angle of incidence is −60°, the angle of detection is 60°, and the measuring range is from 1.5 to 5.0 eV.

The thickness of the anchor film 9 is usually 0.1 µm or more, preferably 0.3 µm or more, more preferably 0.5 µm or more. An anchor film 9 with a thickness in the above range is thick enough to provide a gas barrier sheet 1 that is rigid enough to have excellent hard coating property. On the other hand, the thickness of the anchor film 9 is usually 10 µm or less, preferably 5 µm or less, more preferably 3 µm or less. An anchor film 9 with a thickness in this range makes it easy to provide a gas barrier sheet 1 having the predetermined degree of flexibility as well as excellent hard coating property.

The anchor film 9 can be formed in any suitable manner. A manner useful herein is that a coating liquid containing the siloxane polymer and other ingredients is applied to the substrate 2 and then dried, for example.

The siloxane-polymer-containing coating liquid can be usually prepared in the following manner. An adequate solvent is prepared; the siloxane compound and the compound A in the predetermined ratio are placed in the solvent, and polymerization of a siloxane polymer is carried out; and, if necessary, ingredients other than the siloxane polymer are added. The solvent may be either a single solvent or a mixture of two or more solvents. When a solvent mixture is used, methanol, ethanol, isopropanol, t-butanol, or the like can be used as the prime solvent. And in order to obtain a more even coating surface, one or more solvents selected from low-boiling-point solvents such as formic acid, and high-boiling-point solvents such as propylene glycol monomethyl ether, ethylene glycol monoethyl ether acetate, ethylene glycol monobutyl ether, ethylene glycol monomethyl ether, cyclohexanone, diethylene glycol dimethyl ether, N-methyl-2-pyrrolidone, dimethylformamide, dimethylacetamide and dimethylsulfoxide can be used as the secondary solvent. The content of the prime solvent in the solvent mixture is usually 60% by weight or more and 90% by weight or less. The formulation of the solvent mixture is changed depending on the surface profile and the hydrophilicity/hydrophobicity of the substrate 2. For example, when the substrate 2 is water repellent and gives a large contact angle, there is a case where an ether having a large number of hydrophobic groups and a saturated hydrocarbon are used as the prime solvent of the solvent mixture.

Prior to polymerizing the siloxane compound and the compound A, the ratio in which the siloxane compound and the compound A are introduced, the manner in which the two compounds are introduced, the temperature, the atmosphere, and so forth are properly selected. Specifically, the ratio in which the siloxane compound and the compound A are introduced may be determined depending on the desired proportions of the two compounds in the siloxane polymer to be produced. A preferred manner in which the two compounds are introduced is that each compound is divided into several portions and is gradually introduced portion by portion so that the polymerization reaction progresses smoothly. The polymerization temperature is usually −20° C. or more and 60° C. or less. It is preferable to carry out the polymerization in an inert atmosphere so as not to cause oxidation, etc. Examples of the inert atmosphere include an atmosphere of argon and that of nitrogen. Besides the above, conventional controls may be made for obtaining the desired siloxane polymer.

For the purpose of controlling the thickness of the anchor film 9, a solvent may be added to the siloxane-polymer-containing liquid to control its solid content after the polymerization is completed. In this case, it is preferred that at least part of the additional solvent be the same as the solvent used for the polymerization. For example, when a solvent mixture has been used for the polymerization, it is preferable to use, as at least part of the additional solvent, the same solvent as the prime solvent of the solvent mixture.

The anchor film 9 can be formed in the following manner. The coating liquid containing the siloxane polymer, prepared in the above-described manner, is applied to the substrate 2 by screen printing, roll coating, Mayer bar coating, gravure coating, spin coating, die coating, or the like and is then dried. Of the above coating processes, die coating is preferred from the viewpoint of industrial productivity and easiness of regulation of film thickness. For drying the coating on the substrate 2, the drying temperature and time may be adequately controlled with consideration for the boiling point of the solvent used.

Whether the anchor film 9 thus formed contains the desired siloxane polymer or not can be confirmed by analyzing the film with a known method. Examples of analytical methods useful for this purpose include XPS (X-ray photoelectron spectroscopy). In this invention, an ESCA LAB220i-XL manufactured by VG Scientific Corp., England is used for the above analysis by XPS. In measurement, MgKα rays having an Ag-3d-5/2 peak intensity of 300 Kcps to 1 Mcps are employed as X-rays, and a slit having a diameter of about 1 mm is used. Measurement is made with a detector set on the normal to the sample surface, and appropriate charge corrections are made. After the measurement, data analysis is conducted with software Eclipse version 2.1 installed in the above instrument, using the peaks corresponding to the binding energies of Si:2p and C:1s. In this data analysis, the peaks are subjected to shift correction that is made relative to the peak of hydrocarbon included in the peaks corresponding to the binding energy of C:1s and then to the determination of the state of binding. Taking, as the compound A, the peak of carbonyl bond or the like that appears in a position other than the position of hydrocarbon peak, and Si peak as the siloxane compound, the peaks are subjected to Shirley background subtraction, and the peak area of each element is subjected to sensitivity correction (Si=0.87 to C=1), thereby obtaining the number-of-atoms ratio. The proportions of the siloxane compound and the compound A in the siloxane polymer can be estimated from the number-of-atoms ratio of Si to carbonyl bond or the like, determined by the compositional analysis made in the above-described manner.

(Gas Barrier Film)

A $SiN_xO_y$ film (x=0.5 to 1.5, y=0.15 to 1) is used as the gas barrier film 3.

The above gas barrier film 3 can contain an increased number of Si—N bonds per unit thickness and also have increased density, so that it can easily attain a high level of gas-barrier properties. Moreover, when the gas barrier film 3 contains a specified amount of oxygen, it has decreased film stress and thus hardly curls. Thus the gas barrier film 3 particularly makes it possible to provide a gas barrier sheet 1 that remains uncurled and retains its gas-barrier properties even after it has undergone a heat cycle test which is carried out to test the durability of an organic EL display or the like.

Further, in the gas barrier sheet 1, the combination of the two layers, the anchor film 9 and the gas barrier film 3, ensures excellent gas-barrier properties. This makes it possible to provide a gas barrier sheet 1 excellent especially in gas-barrier properties. Furthermore, since the above silicon oxynitride film is used as the gas barrier film 3, Si exists in both the gas barrier film 3 and the anchor film 9, which enhances the interaction between the two films. This makes it possible to provide a gas barrier sheet 1 excellent in the adhesion between the anchor film 9 and the gas barrier film 3.

A $SiN_xO_y$ film (x=0.5 to 1.5, y=0.15 to 1) is used as the gas barrier film 3, as mentioned above. Conventionally used as a gas barrier film is a $SiN_aO_b$ film, where a=0.5 and b=1.5, or a=1.4 and b=0.1. However, in the present invention, since the above-specified $SiN_xO_y$ film is used, it is possible to ensure an adequate number of Si—N bonds that contribute to gas-barrier properties and an adequate number of oxygen atoms that make the gas barrier film 3 flexible. The gas barrier film 3, therefore, can have both excellent gas-barrier properties and excellent anti-curl properties.

In the $SiN_xO_y$ film, the gas barrier sheet 3, x is 0.5 or more, preferably 0.7 or more, and 1.5 or less, preferably 1.3 or less. As long as x is in the above range, the number of Si—N bonds is great enough to make the gas barrier film 3 more excellent in gas-barrier properties. On the other hand, y is 0.15 or more, preferably 0.25 or more, more preferably 0.3 or more, and 1 or less, preferably 0.7 or less. As long as y is in the above range, the number of oxygen atoms is great enough to make the gas barrier film 3 flexible. The gas barrier film 3 may contain, as impurities or additives, elements other than Si, N and O within the scope of the present invention.

Whether the gas barrier film 3 formed is a specified $SiN_xO_y$ film or not can be confirmed by determining the ratio of the number of Si atoms to that of N atoms and that of O atoms. For this determination, a conventional method can be employed, and the data obtained from an analysis made by XPS (X-ray photoelectron spectroscopy), for example, can be used. In the present invention, an ESCA LAB220i-XL manufactured by VG Scientific Corp., England is used for the above analysis by XPS. In measurement, MgKα rays having an Ag-3d-5/2 peak intensity of 300 Kcps to 1 Mcps are employed as X-rays, and a slit having a diameter of about 1 mm is used. Measurement is made with a detector set on the normal to the sample surface, and appropriate charge corrections are made. After the measurement, data analysis is conducted with software Eclipse version 2.1 installed in the above instrument, using the peaks corresponding to the binding energies of Si:2p, C:1s, N:1s, and O:1s. In this data analysis, the peaks are subjected to shift correction that is made relative to the peak of hydrocarbon included in the peaks corresponding to the binding energy of C:1s and then to the determination of the state of binding. The peaks are subjected to Shirley background subtraction, and the peak area of each element is subjected to sensitivity correction (Si=0.87, N=1.77, and O=2.85 to C=1), thereby obtaining the number-of-atoms ratio. Taking the number of Si atoms as 1, the number of N atoms and that of O atoms are calculated from the number-of-atoms ratio.

The thickness of the gas barrier film 3 is usually 10 nm or more, preferably 30 nm or more, and usually 200 nm or less, preferably 150 nm or less. A gas barrier film 3 having a thickness in the above range is excellent in both gas-barrier properties and anti-curl properties.

It is preferred that the gas barrier film 3 be transparent if it is used as a gas barrier film in a light-emitting device, such as an organic EL display, which must be transparent. By making not only the gas barrier film 3 but also the other constituent films such as the substrate 2 transparent, it is possible to obtain a transparent gas barrier sheet 1. More specifically, it is preferable to form the gas barrier film 3 so that it has such high transparency that its mean light transmittance is 75% or more for light of 400 to 700 nm, for example. Since the composition and the thickness of the gas barrier film 3 affect the light transmittance, they are taken into account when forming the gas barrier film 3.

To make the gas barrier film 3 transparent, it is preferable to make the extinction coefficient of the gas barrier film 3 0.000001 or more and 0.01 or less. The extinction coefficient of the gas barrier film 3 is more preferably 0.000005 or more, most preferably 0.00001 or more, and more preferably 0.005 or less. A gas barrier film 3 having a extinction coefficient in the above range is transparent, so that it makes it easy to produce a gas barrier sheet 1 having high transparency.

The extinction coefficient of the gas barrier film 3 can be determined by a conventional method, and an ellipsometer, for example, can be used. In the present invention, the extinction coefficient of the gas barrier film 3 is measured with a UVISEL™ manufactured by JOBIN YVON Corp. Using a xenon lamp as a light source, measurement is made under the following conditions: the angle of incidence is −60°, the angle of detection is 60°, and the measuring range is from 1.5 to 5.0 eV.

The gas barrier film 3 is formed by agglomeration of secondary particles, and the diameter of the secondary particles is preferably 300 nm or more and 1500 nm or less. Secondary particles having a diameter in this range fully agglomerate. Thus it is possible to produce a gas barrier sheet 1 having excellent gas-barrier properties while retaining the flexibility of the substrate, without causing a decrease in productivity.

Generally, the gas barrier film 3 is formed by agglomeration of multiple secondary particles. That the gas barrier film 3 is in such a continuous state that boundaries between the particles are not observed at all is ideal for the greatest improvement in gas-barrier properties. It is, however, not easy to produce such a state. For example, even if a gas barrier film 3 formed/deposited on a substrate 2 capable of withstanding high-temperature sintering (e.g., glass plate) is sintered at a high temperature, it is not easy to eliminate the particle-particle interface completely. Moreover, the sintered thin film is rigid and is less flexible, so that it is easy to crack. However, high-temperature sintering is effective in improving the gas-barrier properties of the gas barrier film 3 because it allows the secondary particles to agglomerate more fully. On the other hand, it is sometimes necessary to use resins or the like for the substrate 2, so that there is a case where a material whose heat resistance is not so high as to withstand high-temperature sintering is used. Therefore, subjecting the gas barrier film 3 to high-temperature sintering after the step of film formation is not practical from the industrial point of view. Additionally conducting the sintering step is not practical also from the viewpoint of production efficiency. Moreover, if the gas barrier sheet 3 is sintered at a high temperature, its flexibility is impaired, so that the flexibility characteristic of the resin-made substrate 2 is offset by the decreased flexibility of the gas barrier film 3 sintered. It is therefore desirable to provide, without conducting high-temperature sintering, a gas barrier film 3 with gas-barrier properties comparable to those of a gas barrier film sintered at a high temperature.

We continued to make studies on the gas barrier film 3 and found the following. If a gas barrier film is formed/deposited by ion plating, which will be described later, not heat but a plasma acts on the film to attain almost the same level of reactivity as that in high-temperature sintering even right after film deposition. This makes it easier to ensure excellent gas-barrier properties. Thus a gas barrier film 3 that is not rigid but flexible can be obtained, and this makes it easier to produce a gas barrier sheet 1 having excellent gas-barrier properties, while retaining the flexibility of the substrate 2. Specifically, we found the following: in an ion plating process, agglomeration of secondary particles takes place, and it is easy for the secondary particles to have a diameter of 300 nm or more and 1500 nm or less, so that it becomes easier to ensure excellent gas-barrier properties without impairing the flexibility of the substrate 2. To obtain more excellent gas-barrier properties, the diameter of the secondary particles is made more preferably 330 nm or more, most preferably 400 nm or more, and more preferably 1000 nm or less.

Although ion plating is effective in controlling the diameter of the secondary particles that form the gas barrier film 3, as mentioned above, the state of the anchor film 9 is also useful for this purpose. Specifically, by forming the gas barrier film 3 on the anchor film 9, it becomes easier to control the diameter of the secondary particles to a value in the above range.

In the gas barrier film 3, the distance between two adjacent secondary particles is preferably in the range of 100 nm or more and 300 nm or less. When the distance between two adjacent secondary particles is in the above range, adjacent secondary particles easily agglomerate. This makes it easier to provide a gas barrier sheet 1 with the flexibility of its substrate retained. The distance between two adjacent secondary particles can be determined by measuring the distance between the centers of two circles that are approximations to the two adjacent secondary particles, obtained by a circle approximation.

The diameter of the secondary particles that form the gas barrier film 3, and the distance between two adjacent secondary particles can be measured by conventional methods, and an atomic force microscope (AFM), for example, can be used for these purposes. Specifically, a Nanopics-1000 manufactured by Seiko Instruments Inc., Japan may be used for the measurement, where observation may be made in contact mode, and scanning may be made over a range of 4 μm×4 μm at a rate of 90 seconds/frame. Subsequently, using a trackball, any thirty points are set on software for analysis installed in a personal computer or the like. These points are subjected to least square circle approximation, and the mean diameter of the approximated circles is taken as the diameter of the secondary particles. The distance between two adjacent particles is obtained by calculating the mean distance between the centers of two circles obtained by the above-described circle approximation. Instead of the trackball, such an input device as a mouse or a keyboard may be used.

Any process can be used to form the gas barrier film 3, and vacuum deposition, sputtering, ion plating, Cat-CVD, plasma-enhanced CVD, atmospheric plasma-enhanced CVD, or the like may be employed. The selection of the process for film deposition may be made with consideration for the type of the material to be deposited, easiness of film deposition, process efficiency, and so forth. Some of the above processes useful herein will be described below.

Vacuum deposition is as follows. A material placed in a crucible is heated and vaporized by resistance heating, high-frequency induction heating, beam heating such as electron-beam or ion-beam heating, or the like, thereby depositing the material to a substrate 2 to give a gas barrier film 3. In this process, the heating temperature and the heating method may be changed depending on the desired composition of the gas barrier film 3 to be formed, and others. It is also possible to employ a reactive deposition process which film deposition is accompanied by oxidation reaction or the like.

Sputtering is as follows. A target is placed in a vacuum chamber; rare gas elements (usually argon) ionized by a high voltage are accelerated to bombard the target to knock out the surface atoms; and these atoms are deposited on the anchor film 9 to form a gas barrier film 3. There may also be used a reactive sputtering process which the elements knocked out of the target in the above-described sputtering process are reacted with nitrogen or oxygen by feeding nitrogen or oxygen gas to the chamber, thereby forming a gas barrier film 3. Examples of sputtering processes useful herein include DC two-pole sputtering, RF two-pole sputtering, three-pole sputtering, four-pole sputtering, ECR sputtering, ion-beam sputtering, and magnetron sputtering. It is preferable to use magnetron sputtering from the industrial point of view.

Ion plating is a combined technique of vacuum deposition and plasmas. It is a process for depositing a thin film in which part of evaporating particles are made into ions or excited particles by a gas plasma and the particles thus activated are deposited to form a thin film. Of various types of ion plating processes, reactive ion plating which a reactive gas in a plasma state is used to combine evaporating particles with each other to form a compound film is herein effective. Since operations are performed in plasmas, creating stable plasmas is essential, and low-temperature plasmas, which are weakly ionized plasmas produced at low gas pressures, are often used. For this reason, ion plating is preferably used to deposit a film of a compound mixture or of a double oxide. The ion plating processes are roughly classified into two types depending upon the means for causing electric discharges, DC excitation type and high-frequency excitation type. Besides these types of processes, there is an ion plating process using a hollow cathode or an ion beam for the vaporizing mechanism.

Plasma-enhanced CVD is one of the chemical gas-phase epitaxy processes. In a plasma-enhanced CVD process, a material to be deposited is vaporized and is fed to a plasma discharge formed in a reactor, and the gases in the reactor are activated by their mutual collision to give radicals. Therefore, a reaction at a low temperature, which cannot be caused by thermal excitation alone, becomes possible. The substrate 2 is heated with a heater from the rear, and a film is formed by a reaction that takes place in a discharge formed between the electrodes. The plasma-enhanced CVD processes are classified into three types depending on the frequency to be used, HF (several tens to several hundreds kilohertz) type, RF (13.56 MHz) type, and microwave (2.45 GHz) type. The plasma-enhanced CVD processes using microwave are roughly classified into two groups, processes in which reactive gases are excited and film deposition is conducted in an afterglow, and ECR plasma-enhanced CVD in which microwave is introduced into a magnetic field (875 Gauss) that fulfills the ECR conditions. The plasma-enhanced CVD processes can also be classified into two types depending on the method of plasma production, capacity coupling type (plane parallel plate type) and induction coupling type (coil type).

The barrier film 3 is a $SiN_xO_y$ film, where x is 0.5 to 1.5, and y is 0.15 to 1. It is possible to control the composition of the $SiN_xO_y$ film by changing the deposition conditions to be used in the film deposition process adequately selected from the above-described ones.

(Transparent Conductive Film)

The transparent conductive film 4 is formed on the gas barrier film 3. More specifically, in the gas barrier sheet 1B, the transparent conductive film 4 is situated on the gas barrier film 3, as shown in FIG. 2. The transparent conductive film 4 can serve as the anode of an organic EL display, or can provide the gas barrier sheet 1B with heat-dissipating properties or antistatic properties. It is therefore possible to improve an organic EL display in productivity and life by forming the transparent conductive film 4.

The transparent conductive film 4 is sometimes formed for the purpose of providing the gas barrier sheet 1 with both antistatic properties and heat-dissipating properties, when an organic EL display has an anode. Specifically, when the gas barrier sheet 1 contains therein an organic EL display, it can be provided with the property of dissipating the Joule's heat generated by the organic EL display, or the property of releasing outer electric charges that usually occur on films, by the transparent conductive film 4. For example, the transparent conductive film 4 may be formed in order to prevent the organic EL display from undergoing deterioration by the heat generated, which has been a problem with organic EL displays. When providing the gas barrier sheet 1 with antistatic properties and heat-dissipating properties by the transparent conductive film 4, the transparent conductive film 4 is sometimes formed so that it is in contact with the electrode of the organic EL display. In this case, it is preferable to regulate adequately the electrical conductivity of the transparent conductive film 4 so that an electric current never leaks from the electrode. Specifically, it is preferable to control the surface resistivity of the transparent conductive film 4 to a value in the range of $10^4 \Omega/\square$ or more and $10^6 \Omega/\square$ or less. On the other hand, when an adhesive layer or the like is formed between the transparent conductive film 4 and the electrode of the organic EL display to insulate them from each other, the electrical conductivity of the transparent conductive film 4 can be selected from a range wider than the above range. Specifically, in this case, the surface resistivity of the transparent conductive film 4 can be controlled to a value in the range of $10^4 \Omega/\square$ or more and $10^{12} \Omega/\square$ or less. Further, to ensure high thermally conductivity, the thermal conductivity of the transparent conductive film 4 is usually controlled to a value in the range of 0.5 W/mK or more, preferably 1 W/mK or more, and usually 10 W/mK or less, preferably 8 W/mK or less.

The surface resistivity of the transparent conductive film 4 can be measured by a known method, and, in the present invention, it is measured with a high-resistance meter High-resta UP (MCP-HT 450) manufactured by Dia Instruments Co., Ltd., Japan. Also the thermal conductivity of the transparent conductive film 4 can be measured by a known method, and, in this invention, it is measured with a steady-heat-flow-type thermal conductivity meter of GH Series manufactured by ULVAC-RIKO Co., Ltd., Japan.

From the viewpoint of electrical conductivity, the transparent conductive film 4 may be a coating film containing as a main component an inorganic oxide, formed by applying a hydrolysate of a metal alkoxide or the like, or a mixture of transparent conductive particles and a hydrolysate of a metal alkoxide or the like.

From the viewpoint of electrical conductivity, the transparent conductive film 4 may be a film formed by vacuum deposition such as resistance heating deposition, induction heating deposition, EB deposition, sputtering, ion plating, thermal CVD, or plasma-enhanced CVD. It is preferable to use an EB deposition, sputtering, or ion plating process to form the transparent conductive film 4 because such a process can give a low resistant film and can employ a system configuration that makes it possible to carry out surface treatment. Examples of materials that can be used to form the transparent conductive film 4, using the above processes, include oxides such as indium-tin oxides (ITO), indium-tin-zinc oxides (ITZO), zinc oxides such as $ZnO_2$, CdO (cadmium oxide) compounds, $SnO_2$ (tin oxide) compounds, indium oxide, indium-zinc oxides (IZO), aluminum-added zinc oxides, gallium-added zinc oxides and antimony-added tin oxides; metals such as gold, silver, copper, aluminum and palladium; and laminates of oxides and metals. Although any material adequately selected from the above-enumerated ones can be used to form the transparent conductive film 4, indium-tin oxides (ITO) are preferred because they are excellent in transparency and electrical conductivity. To form a transparent conductive film 4 having more excellent heat-dissipating properties, materials capable of absorbing infrared light are preferably used. Also from this point of view, it is preferable to use indium-tin oxides (ITO). If an indium-tin oxide (ITO)

is used, it is particularly preferable to use one whose tin content is from 5 to 15 mol %.

The thickness of the transparent conductive film 4 is usually 10 nm or more, preferably 60 nm or more, more preferably 100 nm or more. The transparent conductive film 4 has electrical conductivity and heat-dissipating properties when its thickness is in the above range. On the other hand, the thickness of the transparent conductive film 4 is usually 1000 nm or less, preferably 450 nm or less, more preferably 200 nm or less. The transparent conductive film 4 is transparent and has high flexing resistance when its thickness is in the above range.

(Hard-Coating Film)

The hard-coating film 5 is formed on at least one surface (one of the outermost surfaces) of the gas barrier sheet 1C, as shown in FIG. 3. More specifically, the hard-coating film 5 is formed on the other surface 12 of the substrate 2, i.e., on the outermost surface on the side opposite to the side on which the anchor film 9A is present. Thus the hard-coating film 5 serves to protect the gas barrier sheet 1C, and this makes it easier to provide a gals barrier sheet 1C that is hardly scratched.

A conventional film can be used as the hard-coating film 5. Specifically, ionized-radiation-curing resins containing acrylate functional groups, i.e., resins having acrylic or epoxy structure, are suited to the hard-coating film 5. When the hardness, heat resistance, solvent resistance, and scratch resistance of the hard-coating film 5 are taken into consideration, it is preferred that the structure of the hard-coating film 5 be of high crosslink density. Examples of materials useful for obtaining such structure include acrylate monomers having two or more functional groups, such as ethylene glycol di(meth)acrylate, 1,6-hexanediol diacrylate, trimethylolpropane tri(meth)acrylate, pentaerythritol tri(meth)acrylate, dipentaerythritol penta(meth)acrylate, and dipentaerythritol hexa(meth)acrylate. The term "(meth)acrylate" used herein means both acrylate and methacrylate.

When the above-described ionized-radiation-curing resins are used to form the hard-coating film 5, known photopolymerization initiators and photosensitizers may be used together with them. Photopolymerization initiators and photosensitizers are preferably used when ultraviolet light is used to cure ionized-radiation-curing resins. This is because ionized-radiation-curing resins fully cure when irradiated with electron beams. The amount of a photopolymerization initiator and a photosensitizer to be added to an ionized-radiation-curing resin is 0.1 parts by weight or more and 10 parts by weight or less for 100 parts by weight of the ionized-radiation-curing resin. Besides these agents, a variety of inorganic or organic additives, such as solvents, catalytic hardeners, wettability-improving agents, plasticizers, anti-foaming agents, and thickeners, may be added, as needed.

By applying a coating liquid formulated from the above materials to the substrate 2, and curing the coating, the hard-coating film 5 can be formed. The suitable amount of the coating liquid to be applied is usually 0.5 g/m² or more and 15 g/m² or less when expressed on a solid matter basis. Examples of sources of ultraviolet light useful herein for curing include ultra-high-pressure mercury vapor lamps. Ultraviolet light with a wavelength of 190 nm or more and 380 nm or less can be usually used. Examples of sources of electron beams useful herein for curing include a variety of electron beam accelerators, such as Cockcroft-Walton accelerators.

The thickness of the hard-coating film 5 is usually 1 μm or more, preferably 3 μm or more, and usually 10 μm or less, preferably 8 μm or less. The hard-coating film 5 hardly impairs the transparency of the gas barrier sheet 1C and can also make the gas barrier sheet 1C highly resistant to scratching, when its thickness is in the above range.

(Other Films)

Films other than the above-described substrate 2, anchor film 9, gas barrier film 3, transparent conductive film 4 and hard-coating film 5 can also be used, as needed. Examples of such additional films include anti-reflection films, antistatic films, anti-staining films, anti-glaring films, color filters, and smoothing films. Of these, an anti-reflection film, an antistatic film, an anti-staining film, an anti-glaring film, or a color filter may be stuck to a gas barrier sheet of the present invention with an optical pressure sensitive adhesive so that the gas barrier sheet is additionally provided with the desired properties.

The anti-reflection film is a film having the property of preventing a surface from reflecting external light. The antistatic film is a film having the property of preventing a surface from drawing dust. The anti-staining film is a film having the property of preventing a surface from being stained with oils and fats, such as fingermarks. These films may be conventional ones, and they are often formed on the surface of the hard-coating film 5. However, the hard-coating film 5 itself may be additionally provided with anti-reflection properties or with both transparency and electrical conductivity. The smoothing film is used for smoothing a surface, and it may be formed on the surface of the substrate 2 or of the gas barrier film 3, for example.

A conventional smoothing film can be used in the present invention. Examples of materials useful for the smoothing film include sol-gel materials, ionized-radiation-curing resins, thermosetting resins, and photoresist materials.

If the smoothing film is formed on the surface of the gas barrier film 3, it is preferable to use an ionized-radiation-curing resin because it does not impair the gas-barrier properties of the gas barrier film 3 and can easily form a film. More specifically, it is preferable to use an ionized-radiation-curing resin that has a polymerizable unsaturated bond in its molecule and causes crosslinking polymerization when irradiated with ultraviolet (UV) light or electron beams (EB) to give a three-dimensional polymeric structure. Examples of such resins include ionized-radiation-curing resins obtained by blending reactive prepolymers, oligomers, and/or monomers having epoxy group; and liquid compositions prepared by adding thermoplastic resins such as urethane, polyester, acrylic, butyral or vinyl resins, as needed, to ionized-radiation-curing resins and liquefying the mixtures. The smoothing film can be formed by applying the above resin by such a conventional method as roll coating, Mayer bar coating, or gravure coating, and drying and curing the coating. The smoothing film may also be formed in the same manner as that in which the hard-coating film 5 is formed.

When the smoothing film is formed on the surface of the gas barrier film 3, it is also preferable to use a sol-gel material produced by a sol-gel process, if the adhesion to the gas barrier film 3 is taken into account. This is because a sol-gel material can give a coating of a material of the same type as that of the material used for the gas barrier film 3. The sol-gel process is a method for applying a coating composition composed at least of a silane coupling agent having an organic functional group and a hydrolyzable group, and a crosslinkable compound having an organic functional group that reacts with the organic functional group in the silane coupling agent. A known silane coupling agent can be used herein as the silane coupling agent having an organic functional group and a hydrolyzable group, and any of the aminoalkyl dialkoxysilanes and aminoalkyl trialkoxysilanes disclosed in Japanese Laid-Open Patent Publication No. JP2001-207130, for example, can be used. Examples of the crosslinkable compound having an organic functional group that reacts with the organic functional group in the silane coupling agent include those compounds having functional groups that can react with glycidyl group, carboxyl group, isocyanate group, and amino group in oxazoline group or the like. Such compounds may also be selected from known ones. Further, to the above coating composition, a variety of inorganic or organic additives such as solvents, catalytic hardeners, wettability-improving agents, plasticizers, anti-foaming agents, and thickeners may be added, as needed.

Furthermore, it is also preferable to incorporate known Cardo-type polymers into the material for the smoothing film.

The thickness of the smoothing film is usually 0.05 μm or more, preferably 0.1 μm or more, and usually 10 μm or less, preferably 5 μm or less.

(Gas Barrier Sheet)

By forming, on the substrate 2, the above-described anchor film 9, gas barrier film 3, transparent conductive film 4 and hard-coating film 5, and other necessary films, there can be produced a gas barrier sheet 1. Since the anchor film 9 contains a specified siloxane polymer, and the gas barrier film 3 has a specified composition, it is possible to control the transparency, heat resistance and rigidity of the anchor film 9 by controlling the structure of the siloxane polymer, and the combination of the two layers, the anchor film 9 and the gas barrier film 3, ensures excellent gas-barrier properties. Moreover, the interaction between the anchor film 9 and the gas barrier film 3 is enhanced because of Si in the anchor film 9 and Si in the gas barrier film 3, and Si—C bond in the anchor film 9 enhances the interaction between the substrate 2 and the anchor film 9. Thus there can be obtained a gas barrier sheet 1 that has good transparency and high heat resistance, hardly curls, and is excellent in hard coating property, in gas-barrier properties, and in the adhesion between its constituent films.

The gas barrier sheet 1 has such excellent gas-barrier properties that its water vapor permeability and oxygen permeability are 0.1 g/m²/day (g/m²·day) or less and 0.1 cc/m²/day·atm (cc/m²·day·atm) or less, respectively.

It is preferred that the gas barrier sheet 1 be transparent if it is used for a light-emitting device, such as an organic EL display, which must be transparent. Specifically, in this case, the total light transmittance of the gas barrier sheet 1 is preferably 75% or more, more preferably 80% or more. As for color tone, the yellowness index (YI) of the gas barrier sheet 1 is preferably 5 or less, more preferably 3 or less. Since the gas barrier sheet 1 appears yellowish when its YI is greater, it is preferable to control its YI to a value in the above range from the viewpoint of external appearance. The total light transmittance and YI of the gas barrier sheet 1 can be measured with a spectrophotometric calorimeter, for example. In the present invention, a SM color computer SM-C manufactured by Suga Test Instruments Co., Ltd., Japan is used for the measurement of the total light transmittance and YI of the gas barrier sheet 1, which is made in accordance with JIS K7105.

The combination of the specified anchor film 9 and the specified gas barrier film 3 prevents the gas barrier sheet 1 from curling. FIG. 5 is a schematic cross-sectional view showing a method for evaluating the degree of curling of a gas barrier sheet. First, by cutting the gas barrier sheet 1, a gas barrier sheet sample 10 in a specified size is prepared. This sample 10 is placed on a stainless steel plate 6, and the vertical distance L from the surface of the stainless steel plate 6 to the top 8 of the gas barrier sheet sample 10 is measured. Using the measured vertical distance L, the gas barrier sheet 1 is rated in terms of curling on the basis of the predetermined criteria.

It is also possible to evaluate the degree to which the gas barrier sheet 1 has curled in a heat cycle test, by subjecting the gas barrier sheet sample 10 to a heat test (heat cycle test) and measuring again the vertical distance L after the test. Specifically, a heat cycle test which preserving the gas barrier sheet sample 10 in an oven at 150° C. for three hours is repeated five times is carried out. After the heat cycle test, the gas barrier sheet sample 10 is placed again on the stainless steel plate 6, and the vertical distance L from the stainless steel plate 6 to the top of the gas barrier sheet 10 is measured. Using the measured vertical distance L, the gas barrier sheet 1 that has undergone the heat cycle test is rated in terms of curling on the basis of the predetermined criteria. In the present invention, the gas barrier sheet 1 is produced so that it curls only to such a degree that the vertical distance L measured in the above-described manner is usually 3 mm or less both before and after the heat cycle test. A vertical distance L of 1 mm or less is preferred for more excellent performance.

Owing to the specified anchor film 9 combined with the specified gas barrier film 3, the gas barrier sheet 1 is excellent in the adhesion between the substrate 2 and the anchor film 9 and between the anchor film 9 and the gas barrier film 3. Examples of testing methods useful for evaluating the adhesion between the constituent films of the gas barrier sheet 1 include a cross cut test. In the present invention, a cross cut test is performed according to the description of "8.5.1 Cross Cut Test" in JIS-K5400. Specifically, with a cutter guide of 2-mm clearance interval, cuts reaching the substrate 2 are made in the gas barrier film 3 both vertically and horizontally to give 100 square cells. A pressure-sensitive adhesive cellophane tape No. 405 manufactured by Nichiban Co., Ltd., Japan, having a width of 24 mm, is stuck to the gas barrier film 3 surface with the square-cell cuts, and the surface of the cellophane tape is rubbed with a rubber eraser so that the cellophane tape is fully stuck to the gas barrier film 3. After this, the cellophane tape is vertically peeled off from the gas barrier film 3, and the gas barrier film 3 surface is visually observed. The rate of the remaining gas barrier film 3 is taken as a measure of the adhesion between the constituent films of the gas barrier sheet 1, and it is calculated by the equation:

adhesion (%)={1−(the number of the square cells removed/the number of the square cells originally made(=100))}×100, where the square cells removed include not only the square cells fully removed but also the square cells only partially removed.

By conducting the above cross cut test both right after the production of the gas barrier sheet and after a moist heat resistance test, it is possible to evaluate not only the adhesion between the constituent films of the gas barrier sheet 1 right after production, but also the lastingness of the adhesion. The moist heat resistance test can be carried out in the following manner: a gas barrier sheet is preserved in a thermo-hygrostat at a temperature of 60° C. and a humidity of 95% RH for 1,000 hours, for example.

It is preferred that the gas barrier sheet of the present invention be in film form. If the gas barrier sheet is in film form, it can be readily applied to such uses as an organic EL display. The gas barrier sheet of the present invention may also be in rolled form, and such a gas barrier sheet can be used in the process following the production of an organic EL display or the like. The gas barrier sheet of the invention can be used not only as the substrate of an organic EL display or the like, but also as a sealing film that can be a substitute for sealing glass or can.

EXAMPLES

The present invention will now be described more specifically by way of examples. However, the present invention is not limited to the following Examples and is susceptible to modifications without departing from the spirit of the invention.

Example 1

Production of Gas Barrier Sheet

A polyethylene naphthalate film (Teonex® Q65F manufactured by Teijin Dupont Films Japan Limited) with a thickness of 100 μm was used as the substrate.

A coating liquid containing a siloxane polymer was prepared in the following manner. First, 10.01 g of formic acid was added little by little to 61.16 g of stirred ethanol to give an ethanol solution of formic acid. This solution was heated to 40° C. in an atmosphere of nitrogen, and 20.83 g of tetraethoxysilane (TEOS) and 3.03 g of dimethyl oxalate (compound A) were added dropwise to the heated solution under reflux, thereby polymerizing TEOS and the compound A. After the dropwise addition of the compounds, the mixture was cooled to room temperature to give the desired siloxane-polymer-containing coating liquid. The coating liquid was diluted with a solvent mixture (ethanol:methanol=2:1) so that the weight ratio of the coating liquid to the solvent mixture was 1:1 (the nonvolatile content of the diluted coating liquid: 5% by weight).

The diluted coating liquid was applied to the substrate by die coating to form a coating with a thickness of about 1 μm. This coating was preheated at 60° C. for 1 minute and was then heated at 120° C. for 3 minutes for thermal curing to give an anchor film.

Subsequently, a $SiN_xO_y$ film with a thickness of 40 nm was formed on the anchor film by ion plating. The conditions used in the ion plating process were as follows:

Conditions of film deposition:

| | |
|---|---|
| electric power applied | 5.1 kW |
| material to be deposited | silicon nitride |
| flow rate of argon | 15 sccm |
| flow rate of oxygen | 5 sccm |

The properties of the gas barrier sheet having the gas barrier film, prepared in the above-described manner, were evaluated by the following methods.

(Compositional Analysis: Anchor Film)

The composition of the anchor film 9 (the constitution of the siloxane polymer and the proportions of TEOS and the compound A in the polymer) was determined by XPS, using an ESCA LAB220i-XL manufactured by VG Scientific Corp., England. In measurement, MgKα rays with an Ag-3d-5/2 peak intensity of 300 Kcps to 1 Mcps were employed as X-rays, and a slit with a diameter of about 1 mm was used. Measurement was made with a detector set on the normal to the sample surface, and appropriate charge corrections were made. After the measurement, data analysis was conducted with software Eclipse version 2.1 installed in the above instrument, using the peaks corresponding to the binding energies of Si:2p and C:1s. In this data analysis, the peaks were subjected to shift correction that was made relative to the peak of hydrocarbon included in the peaks corresponding to the binding energy of C:1s and then to the determination of the state of binding. Taking, as the compound A, the peak of carbonyl bond or the like, appearing in a position other than the position of hydrocarbon peak, and the peak of Si as the siloxane compound, the peaks were subjected to Shirley background subtraction, and the peak area of each element was subjected to sensitivity correction (Si=0.87 to C=1.0), thereby obtaining the proportion of the number of atoms. The results were that the proportion of the number of Si atoms was 50% and that the proportion of the number of carbonyl bonds was 10%. Thus the siloxane polymer proved to be composed of TEOS (siloxane compound) and dimethyl oxalate (compound A). Further, it can be considered from the above results that the proportions of TEOS and dimethyl oxalate in the siloxane polymer are 50 mol % and 5 mol %, respectively.

(Compositional Analysis: Gas Barrier Film)

The composition of the gas barrier film (the values of x and y in $SiN_xO_y$), more specifically, the number-of-atoms ratio of Si to N and O, was determined by XPS using an ESCA LAB220i-XL manufactured by VG Scientific Corp., England. In measurement, MgKα rays with an Ag-3d-5/2 peak intensity of 300 Kcps to 1 Mcps were employed as X-rays, and a slit with a diameter of about 1 mm was used. Measurement was made with a detector set on the normal to the sample surface, and appropriate charge corrections were made. After the measurement, data analysis was conducted with software Eclipse version 2.1 installed in the above instrument, using the peaks corresponding to the binding energies of Si:2p, N:1s, and O:1s. In this data analysis, the peaks were subjected to Shirley background subtraction, and the peak area of each element was subjected to sensitivity correction (Si=0.87, N=1.77, and O=2.85 to C=1.0), thereby obtaining the number-of-atoms ratio. Taking the number of Si atoms as 1, the number of N atoms and that of O atoms were calculated. x and y obtained from the calculation were 1.10 and 0.20, respectively.

(Measurement of Water Vapor Permeability)

The water vapor permeability of the gas barrier sheet was measured with a water vapor permeability meter (PERMATRAN-W 3/31 (trade name) manufactured by MOCON Corp., U.S.A.) at a temperature of 37.8° C. and a humidity of 100% RH. The limit of detection of the water vapor permeability meter was 0.05 g/m$^2$·day, and the measured water vapor permeability was under the limit of detection.

(Measurement of Oxygen Permeability)

The oxygen permeability of the gas barrier sheet was measured with an oxygen permeability meter (OX-TRAN 2/20 (trade name) manufactured by MOCON Corp., U.S.A.) at a temperature of 23° C. and a humidity of 90% RH. The limit of detection of the oxygen permeability meter was 0.05 cc/m$^2$·day·atm, and the measured oxygen permeability was under the limit of detection.

(Measurement of Total Light Transmittance and Color Tone (YI))

Using an SM color computer SM-C manufactured by Suga Test Instruments Co., Ltd., Japan, the total light transmittance and the yellowness index (YI) of the gas barrier sheet were measured in accordance with JIS K7105. The results were as follows: the total light transmittance was 85.6%, and the YI was 0.6.

(Evaluation of Curling)

The gas barrier sheet was rated in terms of curling in the following manner. A gas barrier sheet sample 10 in a size of 15 cm×15 cm, as shown in FIG. 5, was cut from the gas barrier sheet. As shown in the figure, the gas barrier sheet sample 10 was placed on a stainless steel plate 6, and the vertical distance L from the stainless steel plate 6 to the top 8 of the gas barrier sheet sample 10 was measured. Rating of the gas barrier sheet in terms of curling was made on the basis of the following criteria. The gas barrier sheet was rated "◯".

◯: the vertical distance L is less than 1 mm,
Δ: the vertical distance L is 1-3 mm, and
x: the vertical distance L is more than 3 mm.

Next, the gas barrier sheet sample 10 was subjected to a heat cycle test, and the vertical distance L was measured again after the heat cycle test. The heat cycle test was that preserving the gas barrier sheet sample 10 in an oven at 150° C. for three hours and then cooling it to room temperature was repeated five times. The gas barrier sheet sample 10 that had undergone the heat cycle test was placed again on the stainless steel plate 6, and the vertical distance L from the stainless steel plate 6 to the top of the gas barrier sheet sample 10 was measured. Rating of the gas barrier sheet in terms of curling was made on the basis of the above criteria. The gas barrier sheet that had undergone the heat cycle test was rated "○".

(Determination of Extinction Coefficient)

The extinction coefficient of the anchor film and that of the gas barrier film were determined by the use of a UVISEL™ manufactured by JOBIN YVON Corp. Using a xenon lamp as a light source, measurement was made under the following conditions: the angle of incidence was −60°; the angle of detection was 60°; and the measuring range was from 1.5 eV to 5.0 eV. The results of the measurement were as follows: the extinction coefficient of the anchor film was 0.0001, and that of the gas barrier film was 0.008.

(Evaluation of Adhesion between Constituent Films)

The adhesion between the constituent films of the gas barrier sheet was evaluated by a cross cut test. Specifically, the evaluation was made according to the description of "8.5.1 Cross Cut Test" in JIS-K5400. Namely, with a cutter guide of 2-mm clearance interval, cuts reaching the substrate were made in the gas barrier film both vertically and horizontally to give 100 square cells. A pressure-sensitive adhesive cellophane tape No. 405 manufactured by Nichiban Co., Ltd., Japan, having a width of 24 mm, was stuck to the gas barrier film surface with the square-cell cuts, and the surface of the cellophane tape was rubbed with a rubber eraser so that the cellophane tape was fully stuck to the gas barrier film. After this, the cellophane tape was vertically peeled off from the gas barrier film. The gas barrier film surface was visually observed. The rate of the remaining gas barrier film was taken as a measure of the adhesion between the constituent films of the gas barrier sheet, and it was calculated by the equation:

adhesion (%) {1−(the number of the square cells removed/the number of the square cells originally made(=100)}×100, where the square cells removed include not only the square cells fully removed but also the square cells only partially removed.

The cross cut test was carried out both right after the production of the gas barrier sheet and after a moist heat resistance test. The moist heat resistance test was made using a digital thermo-hygrostat PR-3K manufactured by Espec Co., Ltd., Japan, where the gas barrier sheet was preserved in the thermo-hygrostat at a temperature of 60° C. and a humidity of 95% RH for 1,000 hours.

The test results were as follows: the adhesion between the constituent films of the gas barrier sheet right after production was 100%, and the one evaluated after the moist heat resistance test was also 100%.

(Measurement of Diameter of and Distance between Secondary Particles)

The diameter of the secondary particles forming the gas barrier film and the distance between two adjacent secondary particles were measured. Specifically, a Nanopics-1000 manufactured by Seiko Instruments Inc., Japan was used for the measurement, where observation was made in contact mode, and scanning was made over a range of 4 μm×4 μm at a rate of 90 seconds/frame. Subsequently, using a trackball, any thirty points were set on software for analysis installed in a personal computer. These points were subjected to least square circle approximation, and the mean value of the diameters of the approximated circles was taken as the diameter of the secondary particles. The distance between two adjacent particles was obtained by calculating the mean distance between the centers of two circles obtained by the above circle approximation. The results were as follows: the diameter of the secondary particles was 450 nm, and the distance between two adjacent secondary particles was 210 nm.

Comparative Example 1

A gas barrier sheet was produced in the same manner as in Example 1, except that the gas barrier film was not formed. The water vapor permeability, the oxygen permeability, the total light transmittance, and the color tone (YI) of the gas barrier sheet were measured in the same manner as in Example 1. The results were as follows: the water vapor permeability was 1.2 g/m$^2$·day, the oxygen permeability, 3.4 cc/m$^2$·day·atm, the total light transmittance, 86.3%, and the YI, −0.4 (blue).

Comparative Example 2

A gas barrier sheet was produced in the same manner as in Example 1, except that the anchor film was not formed. The adhesion between the constituent films of the gas barrier sheet was evaluated in the same manner as in Example 1. The results were as follows: the adhesion evaluated right after the production of the gas barrier sheet was 100%, and the one evaluated after the moist heat resistance test was 95%.

Comparative Example 3

A gas barrier sheet was produced in the same manner as in Example 1, except that an acrylic resin was used to form the anchor film and that the thickness of the anchor film was made 3 μm. Specifically, the following resin composition was applied to the substrate with a wire bar #10 and was then irradiated with 300 mJ of ultraviolet light, thereby forming the anchor film.

| <UV-Curing Resin Composition> | |
|---|---|
| Ethylene glycol di(meth)acrylate | 50 parts |
| Photopolymerization initiator (Irgacure 184 manufactured by CIBA-GEIGY AG.) | 5 parts |
| Solvent (toluene) | 50 parts |

The water vapor permeability, the oxygen permeability, the total light transmittance, and the color tone (YI) of the gas barrier sheet were measured in the same manner as in Example 1. The results were as follows: the water vapor permeability was under the limit of detection, the oxygen permeability was also under the limit of detection, the total light transmittance was 80.6%, and the YI was 5.4. As can be understood from the YI value, the gas barrier sheet was yellowish. The reason for this is as follows: the number of unsaturated bonds in the acrylic-resin-made anchor film increased during the thermal treatment carried out in the production of the gas barrier sheet, so that the gas barrier sheet absorbed the blue component of visible light to become yellow.

Example 2

By ion plating, a second gas barrier film ($SiN_xO_y$ film) with a thickness of 40 nm and a transparent conductive film with a thickness of 30 nm were further formed on the surface of the substrate of the gas barrier sheet of Example 1, on the side on which the anchor film and the gas barrier film ($SiN_xO_y$ film) were not present, thereby producing a gas barrier sheet. The conditions used in the ion plating process were as follows.

Conditions of Second Gas Barrier Film Deposition:

| Electric power applied | 5.1 kW |
|---|---|
| Material to be deposited | $SiN_xO_y$ (x = 0.1, y = 1.0) |
| Flow rate of argon | 15 sccm |
| Flow rate of oxygen | 5 sccm |

Conditions of Transparent Conductive Film Deposition:
Material: ITO particles (15% Sn)
Pressure at film deposition: 0.1 Pa
Flow rate of Ar: 10 sccm
Flow rate of oxygen: 10 sccm
Electric power applied: 4.0 kW The surface resistivity and the thermal conductivity of the transparent conductive film were measured with a high-resistance meter Highresta UP (MCP-HT450) manufactured by Dia Instruments Co., Ltd., Japan and a steady-heat-flow-type thermal conductivity meter of GH series manufactured by ULVAC-RIKO CO., LTD., Japan, respectively. The results were that the surface resistivity was $1.5 \times 10^4 \Omega/\square$ and that the thermal conductivity was 4 W/mK.

The evaluation of the gas barrier sheet thus produced was made in the same manner as in Example 1, except that the water vapor permeability was measured with an instrument with a higher limit of detection (0.5 mg/m² day). The result of the compositional analysis of the second barrier film was that, in $SiN_xO_y$, x and y were 1.0 and 0.15, respectively. The other properties of the gas barrier sheet were as follows.

Water vapor permeability: 0.0015 g/m²·day
Oxygen permeability: 0.05 cc/m²·day·atm
Total light transmittance: 78.5%
YI: 3.8
Curling: "○" both before and after the heat cycle test
Extinction coefficient of the second gas barrier film: 0.005
Adhesion between the constituent films:
100% right after production, and
100% after the moist heat resistance test Example 3

A gas barrier sheet was produced in the same manner as in Example 2, except that the following ion plating conditions were used instead of the conditions used in Example 2.
Conditions of Transparent Conductive Film Deposition:
Material: ITO particles (20% Sn)
Pressure at film deposition: 0.1 Pa
Flow rate of Ar: 10 sccm
Flow rate of oxygen: 20 sccm
Electric power applied: 4.0 kW The surface resistivity and the thermal conductivity of the transparent conductive film, measured in the same manners as in Example 2, were $4.3 \times 10^5 \Omega/\square$ and 8 W/mK, respectively.

Since the anchor film, the gas barrier film, and the second gas barrier film in the gas barrier sheet prepared in the above-described manner were the same as those in Example 2, these three films were not evaluated in this Example; and only the gas barrier sheet was evaluated in the same manner as in Example 2, except that the water vapor permeability was measured in the same manner as in Example 2. The results are shown below.

Water vapor permeability: 0.0021 g/m²·day
Oxygen permeability: 0.05 cc/m²·day·atm
Total light transmittance: 78.1%
YI: 3.7
Curling: "○" both before and after the heat cycle test
Adhesion between the constituent films:
100% right after production, and
100% after the moist heat resistance test Comparative Example 4

A trial was made to produce a gas barrier sheet in the same manner as in Example 1, except that a siloxane polymer composed of TEOS alone, obtained without using the compound A, was used to form the anchor film. Specifically, 18.01 g of deionized water was added to 32.04 g of methanol to give a solution, and the solution was heated to 80° C. in an atmosphere of nitrogen. 20.83 g of TEOS was added dropwise to the heated solution under reflux, and the mixture was stirred for one hour, thereby obtaining a coating liquid. The substrate was spin-coated with the coating liquid. However, since the coating liquid contained no polymerization agent, only a natural polymerization reaction took place due to the water. Consequently, the coating thus formed had a surface roughened with particles and was not uniform in thickness. Thus it was impossible to produce a gas barrier sheet.

Example 4

A gas barrier sheet was produced in the same manner as in Example 1, except that a siloxane polymer consisting of 76.9 mol % of TEOS and 23.1 mol % of dimethyl malonate was used to form the anchor film.

Specifically, a siloxane-polymer-containing coating liquid was prepared in the following manner. First, 10.01 g of formic acid was added little by little to 61.16 g of stirred ethanol to give an ethanol solution of formic acid. This solution was heated to 40° C. in an atmosphere of nitrogen, and 20.83 g of TEOS and 3.39 g of dimethyl malonate (compound A) were added dropwise to the heated solution, thereby polymerizing TEOS and dimethyl malonate. After the dropwise addition of the compounds, the mixture was cooled to room temperature to give a siloxane-polymer-containing coating liquid. This coating liquid was diluted with a solvent mixture (ethanol:methanol=1:1) so that the weight ratio of the coating liquid to the solvent mixture was 1:1 (the nonvolatile content of the diluted coating liquid: 5% by weight).

The above coating liquid was applied to the substrate by die coating to form a coating with a thickness of about 1 μm. This coating was preheated at 60° C. for 1 minute and was then heated at 150° for 15 minutes for thermal curing to give an anchor film.

The diameter of the secondary particles forming the gas barrier sheet thus obtained and the distance between two adjacent secondary particles were determined in the same manner as in Example 1. The results were as follows: the diameter of the secondary particles was 350 nm, and the distance between two adjacent secondary particles was 140 nm. Subsequently, the gas barrier sheet was evaluated in terms of various properties as in Example 1, provided that the water vapor permeability was measured in the same manner as in Example 2. The results are shown below.

Water vapor permeability: 0.0065 g/m$^2$·day
Oxygen permeability: 0.05 cc/m$^2$·day·atm
Total light transmittance: 85.0%
YI: 1.5
Curling: "○" both before and after the heat cycle test
Extinction coefficient of the anchor film: 0.01
Adhesion between the constituent films:
100% right after production, and
95% after the moist heat resistance test Example 5

By ion plating, a transparent conductive film with a thickness of 30 nm was further formed on the gas barrier film (SiN$_x$O$_y$ film) in the gas barrier sheet of Example 1, thereby producing a gas barrier sheet. The ion plating conditions were as follows.
Conditions of Transparent Conductive Film Deposition:
Material: ITO particles (15% Sn)
Pressure at film deposition: 0.1 Pa
Flow rate of Ar: 10 sccm
Flow rate of oxygen: 10 sccm
Electric power applied: 4.0 kW The surface resistivity and the thermal conductivity of the transparent conductive film, measured in the same manners as in Example 2, were $1.5 \times 10^4 \Omega/\square$ and 4 W/nK, respectively.

The gas barrier sheet produced in the above-described manner was evaluated in terms of various properties as in Example 1, provided that the water vapor permeability was measured in the same manner as in Example 2. The results are shown below.
Water vapor permeability: 0.0008 g/m$^2$·day
Oxygen permeability: 0.05 cc/m$^2$·day·atm
Total light transmittance: 79.6%
YI: 3.2
Curling: "○" both before and after the heat cycle test
Adhesion between the constituent films:
100% right after production, and
100% after the moist heat resistance test

The invention claimed is:

1. A gas barrier sheet for an organic EL display comprising:
a substrate;
a first and second anchor film formed on a first and second surface of the substrate, respectively; and
a first and second gas barrier film formed on the first and second anchor films, respectively;
wherein the anchor films comprise a siloxane polymer composed of a siloxane compound and a compound A having in its molecule a functional group that reacts with a hydroxyl group in the siloxane compound when the compound A is reacted with the siloxane compound, wherein the siloxane compound is tetraethoxysilane, and wherein the compound A is diethyl oxalate or diethyl malonate, and wherein the siloxane polymer is composed of 70 to 95 mol % of the siloxane compound and 5 to 30 mol % of the compound A;
wherein the gas barrier films are each a SiN$_x$O$_y$ film, where x is 0.5 to 1.5, and y is 0.15 to 1; and
wherein the anchor films each have an extinction coefficient in the range of 0.00001 to 0.01.

2. The gas barrier sheet for an organic EL display according to claim 1, wherein the gas barrier films each have an extinction coefficient in the range of 0.000001 to 0.01.

3. The gas barrier sheet for an organic EL display according to claim 1, further comprising a transparent conductive film formed on one or both of the gas barrier films.

4. The gas barrier sheet for an organic EL display according to claim 1, further comprising a hard-coating film formed on at least one of its outermost surfaces.

5. The gas barrier sheet for an organic EL display according to claim 1, wherein the gas barrier films are formed by agglomeration of multiple particles, the diameter of the particles being 300 nm or more and 1500 nm or less.

6. The gas barrier sheet for an organic EL display according to claim 5, wherein the distance between two adjacent particles is 100 nm or more and 300 nm or less.

* * * * *